(12) United States Patent
Haider et al.

(10) Patent No.: US 9,137,289 B2
(45) Date of Patent: Sep. 15, 2015

(54) FACILITATING A STATELESS TRANSMISSION OF DATA IN AN INFORMATION TECHNOLOGY SYSTEM

(75) Inventors: Sultan Haider, Erlangen (DE); Georg Heidenreich, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 489 days.

(21) Appl. No.: 13/585,474

(22) Filed: Aug. 14, 2012

(65) Prior Publication Data

US 2014/0052815 A1 Feb. 20, 2014

(51) Int. Cl.
*G06F 15/16* (2006.01)
*H04L 29/08* (2006.01)

(52) U.S. Cl.
CPC ............ *H04L 67/02* (2013.01); *H04L 67/2871* (2013.01)

(58) Field of Classification Search
CPC ............................ H04L 67/02; H04L 67/2871
USPC ........................................................ 709/217
See application file for complete search history.

(56) References Cited

U.S. PATENT DOCUMENTS

2006/0218267 A1* 9/2006 Khan et al. ..................... 709/224
2008/0146250 A1* 6/2008 Aaron ........................ 455/456.3

* cited by examiner

*Primary Examiner* — Hee Soo Kim
(74) *Attorney, Agent, or Firm* — Lempia Summerfield Katz LLC

(57) ABSTRACT

A method for facilitating a stateless transmission of data between data sources and client devices may be provided. A message is received from each of the data sources. The message includes data obtained by the respective data source and data indicative of a destination address for the data. The destination address is associated with a client device of the client devices. For each message, the data is stored based on the destination address for the data. A request for data is received from one of the client devices. The request includes data indicative of an address associated with the one of the plurality of client devices. When the address associated with the one of the plurality of client devices corresponds to the destination address for any of the stored data, the stored data with the corresponding destination address is transmitted to the one of the client devices.

20 Claims, 4 Drawing Sheets

FACILITATING A STATELESS TRANSMISSION OF DATA IN AN INFORMATION TECHNOLOGY SYSTEM

BACKGROUND

The present embodiments relate to facilitating a stateless transmission of data in an information technology ("IT") system.

In known IT applications, proprietary display systems must be directly connected to electronic data sources before any data may be transferred. The direct connection between the display systems and the electronic data sources is a dedicated, end-to-end connection (also known as a stateful connection or connection-oriented communication). These end-to-end connections are established based on a set of rules that specify how a connection is to be initiated, managed, negotiated, and terminated. For example, to establish an end-to-end connection, parameters, such as the physical address (e.g., IP address) of both the data source and the remote display, the transmission protocol (e.g., TCP), data formats (e.g., XML), presentation layout, etc., must first be determined or agreed-upon. Such a process may, when carried out for the entire IT system, be both capital and time-intensive.

Once the end-to-end connections have been established, the display systems and the electronic data sources connected thereto share a number of dependencies (i.e., the systems and the data sources are dependent on one another). Accordingly, it becomes difficult to change or alter existing end-to-end connections and introduce more display systems and/or electronic data sources into the IT system. Moreover, since IT systems typically employ some sort of centrally-driven authorization or authentication infrastructure in an attempt to authorize or authenticate the data sources and the display systems, it is even more difficult, time-consuming, and costly to change or alter existing end-to-end connections and/or introduce new end-to-end connections.

SUMMARY

The present embodiments relate to facilitating a stateless transmission, rather than a stateful transmission, of data in an IT system. Communications are handled without establishing dedicated communications paths. Data is provided to a server, and the server stores the data. A client device requests any stored data for the client device from the server. The communications occur with intermediate storage and without immediate routing or forwarding from the source to the destination.

In one embodiment, a method is provided for facilitating a stateless transmission of data between a plurality of data sources and a plurality of client devices. The method includes receiving a message from each of the plurality of data sources. The message includes data obtained by the respective data source and data indicative of a destination address for the data. The destination address is associated with a client device of the plurality of client devices. The method also includes storing, for each message, the data based on the destination address for the data. The method further includes receiving a request for data from one of the plurality of client devices. The request for data includes data indicative of an address associated with the one of the plurality of client devices. The method further includes transmitting, when the address associated with the one of the plurality of client devices corresponds to the destination address for any of the stored data, the stored data with the corresponding destination address to the one of the plurality of client devices.

In another embodiment, a system is provided for facilitating a stateless transmission of data between a plurality of mobile data sources and a plurality of client devices. The system includes a server in communication with the plurality of mobile data sources. The server is configured to receive requests from the plurality of mobile data sources. The requests include data obtained by the respective mobile data source and data indicative of a destination address for the data. The destination address is associated with a client device of the plurality of client devices. The server is further configured to generate a file for each destination address that includes the respective data and to store the files based on the destination address for the data in the respective file. The server is also in communication with the plurality of client devices. The server is further configured to receive, via a send port, a request for data from one of the plurality of client devices. The request includes data indicative of an address associated with the one of the plurality of client devices. The server is further configured to transmit when the address associated with the one of the plurality of client devices corresponds to the destination address for any of the stored data, the stored data with the corresponding destination address to the one of the plurality of client devices.

In yet another embodiment, a non-transitory computer-readable storage medium is provided that stores instructions executable by one or more processors to facilitate a stateless transmission of data between a plurality of mobile data sources and a plurality of client devices. The instructions include instructions for receiving requests from the plurality of data sources. The requests are hypertext transfer protocol (HTTP) GET requests that include a uniform resource locator (URL). The URL includes data obtained by the respective data source and data indicative of a logical display name for the data. The logical display name is associated with a client device of the plurality of client devices. The instructions include instructions for extracting, from each request, the data obtained by the data source and the data indicative of the logical display name. The instructions include instructions for creating, for each message, an HTML file that includes the extracted respective data, and storing the files based on the logical display name for the data in the respective file. The instructions further include instructions for receiving requests for data from the plurality of client devices. The requests include data indicative of a logical display name associated with the one of the plurality of client devices. The instructions further include instructions for transmitting, when the logical display name associated with the one of the plurality of client devices corresponds to the logical display name for any of the stored data, the stored data with the corresponding logical display name to the one of the plurality of client devices.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

The present embodiments relate to a method and system for facilitating a stateless transmission of data between a plurality of data sources and a plurality of client devices. Stateless transmission, as used herein, refers to the fact that data may be transmitted between data sources and client devices that are not directly connected to one another via dedicated, end-to-end connections (stateless transmission is akin to a "connectionless" transmission). Instead, a centralized server is provided to facilitate the transmission of data between the data sources and the client devices. The centralized server accepts or receives data and a destination address for the data from the data sources, extracts the data and the destination address, stores the data in a standard format, and, upon request, transmits data to the client device associated with the destination address. This is accomplished despite the fact that the centralized server knows very little about the data sources and the client devices (other than the addresses associated with the data sources and the client devices). The server does not know what type(s) of data sources and/or client devices is (are) being used, does not see the internal operations of the data sources or the client devices, and does not need to manage data between requests. In addition, the centralized server authenticates the data sources to ensure that only authorized data sources are providing data to the server. The centralized server also authenticates client devices to verify that only authorized client devices are requesting and receiving data from the server.

By facilitating a stateless transmission of data, direct, end-to-end connections are not and need not be established between the data sources and the client services. As such, the parameters that must normally be determined before data is transmitted, such as physical address, transmission protocol, presentation layout, etc., need not be determined or agreed-upon. In turn, the number of dependences between the data sources and the client devices is, when compared to known IT systems, reduced. In one embodiment, the only dependency is the syntaxes or naming conventions utilized to transmit the data between the data sources and the server and the server and the client devices. Accordingly, data sources and/or client devices may be easily added to or removed from the IT system, the data sources and/or client devices employed in the IT system may be easily modified, and/or different types (e.g., content, format) of data may be transmitted and displayed, all without having to modify the IT system. The authentication process serves to ensure that unauthorized data sources and/or client devices do not transmit data and/or access data without authorization.

Figure 1:
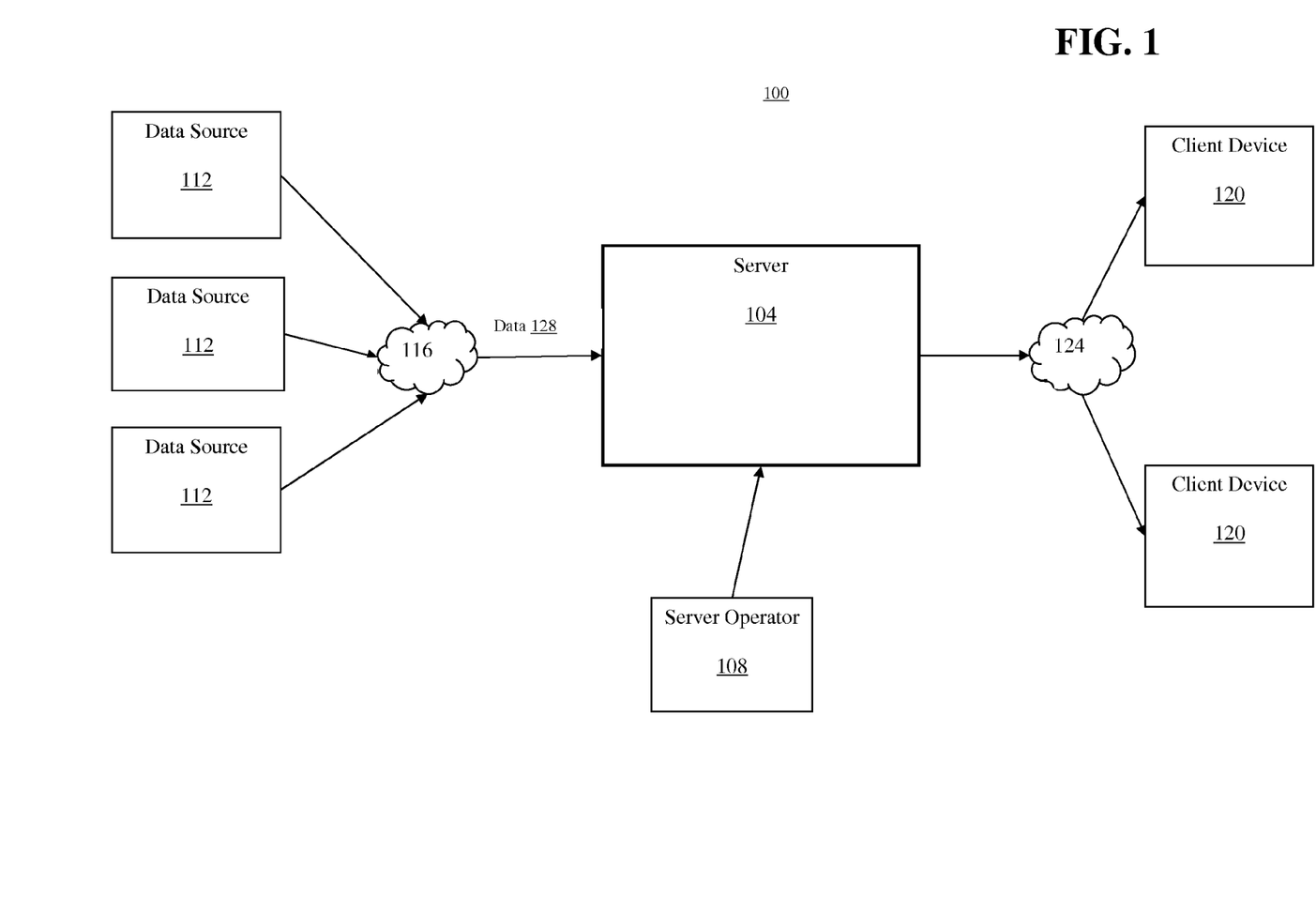
FIG. 1 depicts a block diagram of one embodiment of a system for facilitating a stateless transmission of data.

FIG. 1 shows a block diagram of a system 100 for facilitating a stateless transmission of electronic data in an IT system. The system 100 generally includes an IT server 104 operated by, or otherwise associated with, an IT server operator 108. The server 104 is coupled with or connected to a plurality of electronic data sources 112 via a network 116. The server 104 is also coupled with or connected to a plurality of client devices 120 via a network 124. The plurality of electronic data sources 112 indirectly communicate with the plurality of client devices 120. In other words, the data sources 112 are not directly connected, via one or more end-to-end connections, with the client devices 120. The result is a stateless or "connectionless" communication between the electronic data sources 112 and the client devices 120. As used herein, the phrases "in communication" and "couple" include a direct connection or an indirect connection through one or more intermediate components. Such intermediate components may include hardware and/or software based components. Additional, different, or fewer components may be provided. For example, additional servers 104 and/or networks 116, 124 may be provided. In one embodiment, the server 104 may be implemented as computer program logic or computer readable program code stored in the memory and/or storage of a computer, such as the computer 300 described below with respect to FIG. 4, and may be executable by one or more processors thereof to implement the disclosed functionality.

Figure 2:
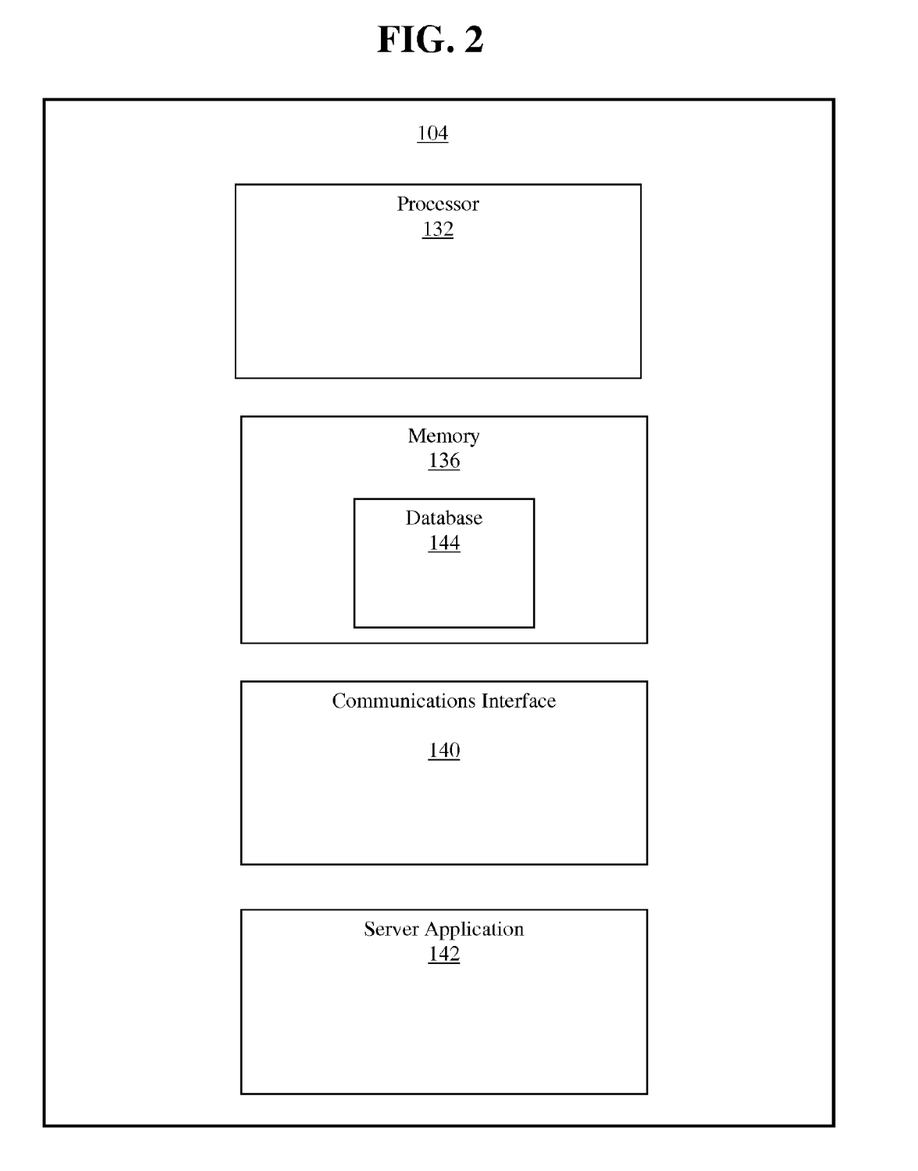
FIG. 2 depicts a block diagram of one embodiment of a server of the system of FIG. 1.

The server 104 may be any type of server, such as a database server, a file server, a web server, or other server. In one embodiment, the server 104 is an HTTP server. As shown in FIG. 2, the server 104 generally includes a processor 132, a memory 136, a communications interface 140, and a server application 142. Additional, different, or fewer components may be provided.

The processor 132 may be a general processor, a digital signal processor, ASIC, field programmable gate array, graphics processing unit, analog circuit, digital circuit, combinations thereof, or other now known or later developed processor. The memory 136 may be a volatile memory or a non-volatile memory. The memory 136 may include one or more of a read only memory (ROM), random access memory (RAM), a flash memory, an electronic erasable program read only memory (EEPROM), or other type of memory. The memory 136 may include an optical, magnetic (hard drive) or any other form of data storage device. The server application 142 may be stored on the memory 136 operated by the server 104 and loaded into the memory 136 of the server 104 to be executed by the processor 132. In other embodiments, the server 104 may include additional, different, or fewer components.

The communications interface 140 is provided to enable or facilitate electronic communication between the server 104 and the plurality of data sources 112 via the network 116 and/or between the server 104 and the plurality of client devices 120 via the network 124. The communications interface 140 may include two or more communication interfaces (e.g., TCP/IP ports), such as an input communications interface devoted to receiving signals, datagrams, data, packets, or information from the plurality of data sources 112 and an output communications interface devoted to receiving signals, datagrams, data, packets, or information from the plurality of client devices 120 and transmitting or sending signals, data, packets, or information to the plurality of client devices 120. In one embodiment, the input communications interface includes a feed port configured to receive or accept data from the plurality of data sources 112, and the output communications interface includes a send port that receives data requests or messages from the plurality of client devices 120 and transmits, delivers, or sends data to the plurality of client devices 120. In other embodiments, the communications interface may include additional or different ports and/or the feed port and the send port may be configured differently. The communications interface 140, particularly the input and output communications interfaces, is configured to facilitate communications using any suitable stateless communications protocols, such as, for example, Internet Protocol (IP), User Datagram Protocol (UDP), or Hypertext Transfer Protocol (HTTP). In other embodiments, one interface 140 may be used for both transmission and reception.

The system 100 may further include an authorization or authentication registry or database 144. In this embodiment, the registry or database 144 is stored or maintained in the memory 136 of the server 104. In other embodiments, the registry or database 144 may be stored elsewhere, such as in an externally located memory (i.e., externally located relative to the server 104) similar to the memory 136.

The electronic data sources 112 are mobile devices, such as a smart phone, a mobile phone, a personal digital assistant ("PDA"), a tablet computer, a notebook computer, another portable or mobile device, or combinations thereof. In other embodiments, one or more of the electronic data sources 112 may be stationary (i.e., not mobile) devices such as, for example, a desktop computer. The data sources 112 are generally configured to obtain electronic data 128. The electronic data sources 112 may obtain the electronic data 128 from another electronic data source 112, a stationary (i.e., not mobile) electronic data source, any other data source, or combinations thereof, may capture or receive the electronic data 128 directly (i.e., the electronic data sources 112 capture the data 128), or combinations thereof. As noted above, the electronic data sources 112 are not directly connected to (i.e., are not in direct communication with) the client devices 120.

The electronic data 128 obtained by the electronic data sources 112 may be any type of data. The data 128 may be text data, video data, audio data, other data, or combinations thereof, stored or maintained in any of a number of different formats (e.g., HTTML, .txt, .rtf, .xml, etc.). In one embodiment, the electronic data 128 is medical data, such as, for example, patient data (e.g., vitals, test results, etc., for a patient) obtained by the one or more electronic data sources 112. In other embodiments, the electronic data 128 may be commercial data (e.g., share value of a stock), electronic weather data (e.g., temperature), electronic sports data, electronic government data, or any other electronic data. Two or more electronic data sources 112 may each obtain similar electronic data 128. Conversely, the electronic data 128 (e.g., medical data) obtained by one or more electronic data sources 112 may be different data (e.g., data of a different type, content, format, etc.) than the electronic data 128 (e.g., weather data) obtained by one or more other electronic data sources 112.

The client device 120 may be a computer (desktop or notebook), a workstation, a display system (e.g., projector system), a mobile device, or other client device. The client devices 120 each generally include a processor, a memory, and a display. The processor and the memory may be similar to or different than the processor 132 and the memory 136 described above in connection with each of the data sources 112. The display is generally configured to display, provide, or present electronic data received from the server 104. The display may be a liquid crystal display (LCD) panel, light-emitting diode (LED) screen, thin film transistor screen, projector, or any other type of display. In one embodiment, the client devices 120 are remotely positioned or located relative to the electronic data sources 112 and the server 104. The remotely positioned client devices 120 may be in a different room, spaced by meters, not in a shared housing, not physically connected, and/or not within view of each other. In another embodiment, the client devices 120 may be remotely positioned or located relative only to the server 104. Software in the form of a Web browser (e.g. Firefox, Internet Explorer) or a plug in or proprietary application built into an operating system of each of the devices 120 may provide an interface, on the display of the client device, between users of the respective client device 120 and the network 124 (e.g. the Internet). Each client device 120 may, in some embodiments, further include an input device, such as one or more buttons, a keypad, a keyboard, a mouse, a stylist pen, a rocker switch, a touch pad, a touch screen, or other input device for manipulating the electronic data received from the server 104 and/or requesting electronic data from the server 104.

The networks 116, 124 may be wireless networks, wired networks, or combinations of a wired and wireless network, such as an 802.11x compliant network, and may include publicly accessible networks, such as the Internet, private networks, or combination thereof. In one embodiment, the network 116 may be the same as the network 124 (and vice-versa). The type and configuration of the communications networks 116, 124 are implementation dependent, and any type of communications network which facilitates the described communications between the server 104 and the data sources 112 and between the server 104 and the client devices 120, available now or later developed, may be used.

With reference again to FIG. 1, each data source 112 of the plurality of data sources 112 may provide (e.g., post, submit, or transmit) the obtained electronic data 128 to the server 104. The data 128 is provided to the server 104 in, within, or as part of a "stateless" message or request provided by each of the data sources 112 to the server 104. The request not only includes the data 128 obtained by the respective data source 112, but also includes data indicative of a destination address for the respective data 128. Each client device 120 is assigned a unique destination address, such that the destination address is associated with or corresponds to a client device 120 of the plurality of client devices 120 that is the intended destination for the data 128. The request may be provided to the server 104 in response to a request for data from the server 104, by an operator or user of the respective data source 112 (using, for example, an input device of the respective data source 112), or at pre-determined times (e.g., every 24 hours).

The request may, in some embodiments, be an HTTP GET request with a uniform resource locator (URL) that includes the data 128 obtained by the respective data source 112 and the data indicative of the destination address for the respective data 128. The data 128 may, for example, be represented (and subsequently transferred to the server 104) as one or more parameters in the respective HTTP GET request. As noted above, the destination address is associated with or corresponds to one client device 120 of the one or more client devices 120 that is the intended destination for the data 128. The destination address may be in the form of a logical display name or a symbolic address that comprises a plurality of numbers, letters, or a combination thereof. For example, the logical display name may be "STUDENT COMPUTER." When included in the URL, the destination address (e.g., the logical display name), serves to uniquely identify the intended destination (e.g., the specific client device 120) for the respective data 128. In other embodiments, the URL further includes additional and/or different information or data, such as data that identifies the server 104 (e.g., the name of the server) and/or an input communications interface (e.g., a port) associated with the server 104 and/or other data. For example, the destination address included in the URL need not be the logical display name and yet still may be indicative of the intended destination for the data 128. In other embodiments, the request or message may be an IP or UDP datagram, a request or message corresponding to a different communications protocol, or another request or message.

As an example, in one embodiment, the HTTP GET request has a URL with the following syntax:

http://ADDRESS:FEEDPORT/LOGICALNAME?parameter1=valueX &parameter 2=valueY, where ADDRESS is the name of the server 104, FEEDPORT is the input communications interface associated with the server 104 (the feed port of the server 104), LOGICAL NAME is the logical name for the destination client device 120, parameter 1 (e.g., the patient's blood pressure) has a value of X (e.g., 120/80), and parameter 2 (e.g., the patient's temperature) has a value of Y (e.g., 98.4 degrees Fahrenheit).

In some embodiments, the request may also include a pre-determined random or non-predictable code or key associated with the destination address and presented or provided with the destination address in an effort to prevent unauthorized access to the IT system (and, more particularly, unauthorized "access" to the client device 120 associated with the respective destination address). The code or key may be formed of letters, numbers, or combinations thereof. The arrangement of the letters and/or numbers that make-up the code or key is not related to the content or type of the respective data 128, nor is it related to the destination address (e.g., the logical display name) for the respective data 128. For example, the request may include the logical display name "STUDENT COMPUTER" with the code "A284JRF."

The server 104 is generally configured to receive or accept the request from each of the plurality of data sources 112. The request is received by, at, or via the input communications interface of the server 104. In one embodiment, the request is received by, at, or via the feed port of the server 104. Once the request has been received or accepted, the server application 142 is configured to extract the data 128 and the destination address (e.g., the logical display name) from the request. The extracted data 128 may, as noted above, be data in any data format. In the embodiments described herein, the server application 142 does not process the extracted data, but rather serves as a conduit for the transmission of the data 128. In some embodiments, however, the server application 142 may also pre-process the extracted data 128. Pre-processing may involve or include feature extraction, filtering, pattern recognition, normalization, compression, format conversion, other pre-processing techniques, or combinations thereof.

As noted above, the system 100 may further include the authentication or authorization registry or database 144. The registry or database 144 may be configured to maintain or store a list of authorized electronic data sources 112 (i.e., electronic data sources authorized or permitted to transmit, post, or submit electronic data 128 to the server 104). The list may, for example, include names, physical addresses (e.g., IP, DNS), certificates, other authentication identifiers, or combinations thereof, of or associated with any and all allowed or authorized electronic data sources 112. Alternatively, the list may include names, physical addresses, certificates, other authentication identifiers, or combinations thereof, of or associated with unauthorized electronic data sources (i.e., electronic data sources 112 that are not permitted to transmit, post, or submit electronic data 128 to the server 104). In either case, the server application 142 is configured to determine or assess the name, physical address, certificate, or other identifier of or associated with the electronic data source 112 from which the request was received, and, based on this determination or assessment, determine whether the electronic data source 112 is authorized or unauthorized. If the server application 142 determines that the data source 112 is authorized, the server application 142 continues the process of facilitating the stateless transmission of the data 128. If, however, the server application 142 determines that the data source 112 is unauthorized, the server application 142 may refuse to accept the data 128 from the source 112, notify the server operator 108, block the source 112, or combinations thereof. The list may be updated to add authorized or unauthorized data sources, remove authorized or unauthorized data sources, or combinations thereof.

Alternatively or additionally, the registry or database 144 may be configured to maintain or store a list of acceptable or allowed destination addresses (e.g., logical display names). The list may provide an indication as to the destination address (e.g., logical display name) assigned or mapped to each client device 120. When the server 104 receives or accepts the request from one of the data sources 112 and after the destination address has been extracted from the request, the server application 142 is configured to determine whether the destination address provided in the request is, based on the registry or database 144, an acceptable or allowed destination address. If the server application 142 determines that the destination address provided in the request is acceptable or allowed, the server application 142 continues the process of facilitating the stateless communication of the data 128. If, however, the server application 142 determines that the destination address provided in the request is not acceptable or allowed (i.e., the destination address is either not listed or is listed as "blocked"), the server application 142 may refuse to accept the data 128 from the source 112, notify the server operator 108, block the source 112, or combinations thereof.

Alternatively or additionally, the registry or database 144 may be configured to store or maintain a list of the pre-determined, random or non-predictable codes or keys associated with the respective destination address. Thus, in the embodiments in which the request includes a code or key, the server application 142 may extract both the destination address and the code or key from the request. Using the list in the registry 144, the server application 142 may verify that the correct code or key has been provided with the destination address. Since only authorized electronic data sources 112 will receive or be aware of the code or key associated with the respective destination address, if the correct code or key has been provided, the server application 142 may determine that the electronic data source 112 is an authorized data source. Conversely, if the correct code or key has not been provided, the server application 142 may determine that the electronic data source 112 is not an authorized data source and the server application 142 may proceed as outlined above. The server application 144 may periodically change or adjust the random or non-predictable codes or keys associated with the destination addresses in order to prevent one or more unauthorized data sources 112 from accessing the server 104.

After the electronic data source 112 and/or the destination address has been authorized for the respective request, the server application 142 is configured to store the respective data 128 based on or according to the destination address for the respective data 128. This generally involves generating or creating a file or document that includes the extracted data 128 or data representative of the extracted data 128 and storing the generated or created file or document based on or according to the destination address for the extracted data 128. The generated or created file or document includes a webpage suitable for the World Wide Web that contains the data 128 or data representative of the data 128. The generated or created file is configured to be displayed on the display of each of the plurality of client devices 120 via the browser or application on each of the client devices 120. The file or document is generally structured based on or according to web-based protocols and mark-up and includes plain text corresponding to or representative of the data 128. In one embodiment, the file or document is an HTML file that includes plain text representative of the data 128. The HTML file may include one or more different data fields that each include a field name and field data associated with or corresponding to the field name. The HTML file may, in some embodiments, include an HTML dialog form configured to receive input commands (e.g., text) from the user or operator of the client device 120, as will be described in greater detail below. In another embodiment, the file or document is an XHTML file or any other file or document, now known or later developed, suitable for the World Wide Web. In some embodiments, the file or document, whether it be an HTML file, XHTML file, or other file, may be structured by the server application 142 according to or based on a given template (e.g., an XML schema file) provided to the server 104 (by, for example, the server operator 108). Accordingly, the file or document may support more complex structures of the data 128 and provides a more structured or organized display representation when the file or document is ultimately displayed.

Once the server application 142 creates or generates the document or file, the server application 142 stores the generated or created file or document based on, as a function of, or according to the destination address for the data in the generated file. More specifically, the generated or created file or document is stored at or with a location or directory path. The file or document is given or assigned a name related to or associated with the destination address for the data in the file. In one embodiment, the name of the file or the document is the same as the destination address. For example, if the destination address for the data is the logical display name "STUDENT COMPUTER," the file or the document containing that data is named "STUDENT COMPUTER." In another embodiment, the destination address for the data may be part (e.g., a substring) of the name assigned to the file or document. In other embodiments, the name of the file or document may be related to the destination address for the data in some other way. In any event, because the destination addresses, particularly the logical display names, are uniquely assigned to the one or more client devices 120, the file or document name, by virtue of being associated with or related to the destination address, is uniquely indicative of the destination for the data 128. The server application 142 may store the documents containing the data 128 on the memory 136 or may store the documents containing the data 128 on a memory external to the server 104 but similar to the memory 136.

When the server 104 receives or accepts a request from one or more of the plurality of data sources 112 and the server 104 determines that a file or document has already been created or generated for the destination address for the data 128 included in the request, the server application 142 may be configured to update the existing file or document to include the "newly received" data 128. This may involve completely or partially replacing the previously stored data 128 with the newly received data 128. Alternatively, this may involve supplementing the previously stored data 128 with the newly received data 128. For example, when the file (e.g., the HTML file) includes one or more different data fields, the server application 142 may update any previously unfilled or uncompleted data fields to include the newly received data 128.

Each client device 120 of the plurality of client devices 120 is configured to provide (e.g., send, transmit, or post) a request for data to the server 104. In some embodiments, the request for data is created or generated by the client device 120. In other embodiments, the server 104, in response to a message (e.g., a start message or request) from the client device 120, creates or generates a file or document (e.g., an HTML file) that includes one or more pre-configured requests for data for that client device 120. The file or document containing the one or more requests for data may then be provided or transmitted, by the server 104, to the client device 120 for subsequent usage. The request for data may be provided to the server 104 in response to a notification, from the server 104, that data is available for that client device 120, in response to input by an operator or user of the respective client device 120 (using, for example, the input device of the device 120), or in response to a trigger occurring at pre-determined times (e.g., every 24 hours).

The request may, in some embodiments, be an HTTP GET request with a uniform resource locator (URL) that includes data indicative of an address associated with the client device 120 submitting, posting, or transmitting the request for data. In other words, the URL includes data indicative of the destination address (the address associated with the client device 120 requesting the data) for the requested data. The address associated with the client device 120 may, as noted above, be in the form of a logical display name that comprises a plurality of numbers, letters, or a combination thereof. In other embodiments, the request or message may be an IP or UDP datagram, a request or message corresponding to a different communications protocol, or another request or message. Alternatively or additionally, the URL may include additional and/or different data or information, such as, for example, data that identifies the server 104 (e.g., the name of the server) and/or an output communications interface (e.g., a port) associated with the server 104.

In further embodiments, the request may also include a pre-determined random or non-predictable code or key, similar to the code or key described above in connection with the request from the data source 112. The pre-determined code or key is presented or provided with the address associated with the client device submitting, posting, or transmitting the request (i.e., the destination address) in an effort to prevent unauthorized access to the IT system (and, more particularly, unauthorized access to the data 128 stored or maintained on the server 104).

The server 104 is generally configured to receive the request for data from a client device 120 of the plurality of client devices 120. The request for data is received by, at, or via the output communications interface of the server 104. In one embodiment, the request for data is received by, at, or via the send port of the server 104. Once the request for data has been received, the server application 142 is configured to extract the address (e.g., the logical display name) from the request for data.

The registry or database 144 may, additionally or alternatively, be configured to maintain or store a list of authorized client devices 120 (i.e., client devices 120 authorized or permitted to transmit, post, or submit requests for data to the server 104, and, ultimately, receive or accept data 128 from the server 104). The list may, for example, include names, destination addresses (e.g., logical display names), physical addresses (e.g., IP, DNS), certificates, other authentication identifiers, or combinations thereof, of or associated with any and all allowed or authorized client devices 120. Alternatively, the list may include names, destination addresses (e.g., logical display names), physical addresses, certificates, other authentication identifiers, or combinations thereof, of or associated with unauthorized client devices 120 (i.e., client devices 120 not authorized or permitted to transmit, post, or submit requests for data to the server 104, and, ultimately, receive or accept data 128 from the server 104). In either case, the server application 142 is configured to determine or assess the name, destination address, physical address, certificate or other identifier of or associated with the client device 120 from which the request for data was received, and, based on this determination or assessment, determine whether the client device 120 is authorized or unauthorized. If the client device 120 is unauthorized, the server application 142 may block the request for data from the client device 120, notify the server operator 108, block or otherwise prevent the client device 120 from submitting or transmitting future requests for data, or combinations thereof. The list may be updated to add authorized or unauthorized client devices 120, remove authorized or unauthorized client devices 120, or combinations thereof.

Alternatively or additionally, the registry or database 144 may be configured to store or maintain a list of the predetermined, random or non-predictable codes or keys associated with the respective destination address. Thus, in the embodiments in which the request for data includes a code or key, the server application 142 may extract both the destination address and the code or key from the request for data. Using the list in the registry 144, the server application 142 may verify that the correct code or key has been provided with the destination address. Since only authorized client devices 120 receive or are aware of the code or key associated with the respective destination address, if the correct code or key has been provided, the server application 142 may determine that the client device 120 is an authorized client device. Conversely, if the correct code or key has not been provided, the server application 142 may determine that the client device 120 is not an authorized client device. Accordingly, the server application 142 may block the request for data from the client device 120, notify the server operator 108, block or otherwise prevent the client device 120 from submitting or transmitting future requests for data, or combinations thereof. The server application 144 may periodically change or adjust the random or non-predictable codes or keys associated with the destination addresses in order to prevent one or more unauthorized client devices 120 from accessing the server 104.

If the client device 120 and/or the destination address associated with the client device 120 is authorized, the server application 142 is configured to determine whether the address associated with the client device 120 that submitted the request for data corresponds with or to the destination address for any of the data 128 received from the plurality of data sources 112 and stored or maintained by the server 104. In other words, the server application 142 determines whether any of the data 128 received from the plurality of data sources 112 and stored by the server 104 was intended or destined to be transmitted or sent to the client device 120 that has submitted the request for data. Since the server application 142 stores the data 128 based on the destination address for the data 128, the server application 142 makes this determination based on or according to the storage of the data 128. More particularly, because the server application 142 generates files containing the data 128 and stores the generated files based on or according to the destination address for the data 128, the server application 142 makes this determination based on or according to the storage of the created or generated files or documents. In the embodiment in which the file or document is stored or saved with a name equivalent to the destination address of the data in the respective file or document, the server application 142 makes this determination by identifying whether any of the files or documents stored by the server 104 has a name that corresponds with the address associated with the client device 120 that has submitted, transmitted, or posted the request for data. In other embodiments, the server application 142 may make this determination in another manner.

When the server application 142 determines that the address associated with the client device 120 that submitted the request for data corresponds to the destination address for any of the data 128 received from the plurality of data sources 112 and stored by the server 104, the server 104, via the server application 142, is configured to provide the data 128 with or having the corresponding destination address to the client device 120 that submitted the request for data. The data 128 is provided or transmitted as part of the file or document created or generated for the corresponding destination address. As noted above, in one embodiment, the file is an HTTP file that includes plain text representative of the data 128. In other embodiments, the file may be an XHTML file or other file or document.

The server 104 is generally configured to provide or transmit the data 128 via or by the output communications interface of the server 104. In one embodiment, the data 128 is transmitted or provided via or by the send port of the server 104. In some embodiments, the authorization of the client device 120 and/or the destination address associated with the client device 120 from which the request for data was received and the transmission of the data 128 are performed in direct response to receiving the request for data (i.e., performed immediately following the receipt of the request for data). In other embodiments, the authorization and transmission occur a short period of time following the receipt of the request for data. In some embodiments, the server 104 is configured to monitor, track, or record when the data 128 is transmitted or provided. This information or data may be used to determine or identify which client devices 120 request and receive the data 128, the most and/or least commonly transmitted data 128, and/or other statistics.

Once the file or document containing the data 128 has been transmitted or provided to the client device 120, the file or document is configured to be displayed on the display of the client device 120. More specifically, the file or document (e.g., HTML file, XHTML file) is configured to be displayed, on the display of the client device 120, in the web browser (e.g., Firefox, Internet Explorer) or plug in or proprietary application built into the operating system of the client device 120. Accordingly, the data 128, which is represented by plain text in the file or document, is displayed, on the display of the client device 120, in the web browser or application. The web browser may be automatically initialized when the client device 120 submits or transmits the request for data to the server 104 or initialized, by, for example, the user of the client device 120. As long as the web browser or application is open or running, the data 128 is displayed. In the event that the file or document is an HTML file that includes an HTML dialog form, the user or operator of the client device 120 may utilize the HTML dialog form to control or operate the data source 112 from which the data 128 was obtained. For example, the user or operator of the client device 120 may enter or provide, in the dialog form, an input command (e.g., text) that is sent, transmitted, or provided back to the data source 112 via the server 104. The input command may, for example, be a request from the client device 120 to the data source 112 for additional and/or different data and/or maybe an instruction to the data source 112 to obtain additional and/or different data 128.

The client device 120 is further configured to send or transmit a request for updated data to the server 104. The request for updated data is similar to the request for data described above. The request for updated data may be sent while the browser or application is still running and displaying the file or document, or the request for updated data may be sent at a different time. The request for updated data may be sent by a user of the client device 120. Alternatively, the server application 142 may modify one or more of the files or documents stored by the server 104 to include a command that causes the web browser or application to repeatedly poll or transmit the request for updated data at, for example, pre-determined times (e.g., every 1 hour). In one embodiment, the server application 142 modifies one of the files to include the following command: <"meta http-equiv=refresh"

content="xxx">. In other embodiments, different commands may be used to accomplish the same function.

In response, the server application 142 may determine whether the file or document having the destination address associated with the client device 120 and stored by the server 104 has been updated to include additional or different data 128, which is provided to the server 104 in the same manner as described above, since or after the data 128 was provided or transmitted to the client device 120. If the server application 142 determines that the file or document has been updated to include the additional or different data 128, the server application 142 may be configured to transmit or provide the updated file or document to the client device 120 for display on the display of the client device. If the browser or application is still running on the client device 120, the updated file or document may be displayed, on the display of the client device 120, in the browser or application. If the browser or application is not running on the client device 120, the updated file or document may be displayed in the browser or application the next time the browser or application is running or opened on the device 120. Alternatively, the receipt of the updated file or document may automatically initialize or open the previously closed browser or application.

Figure 3:
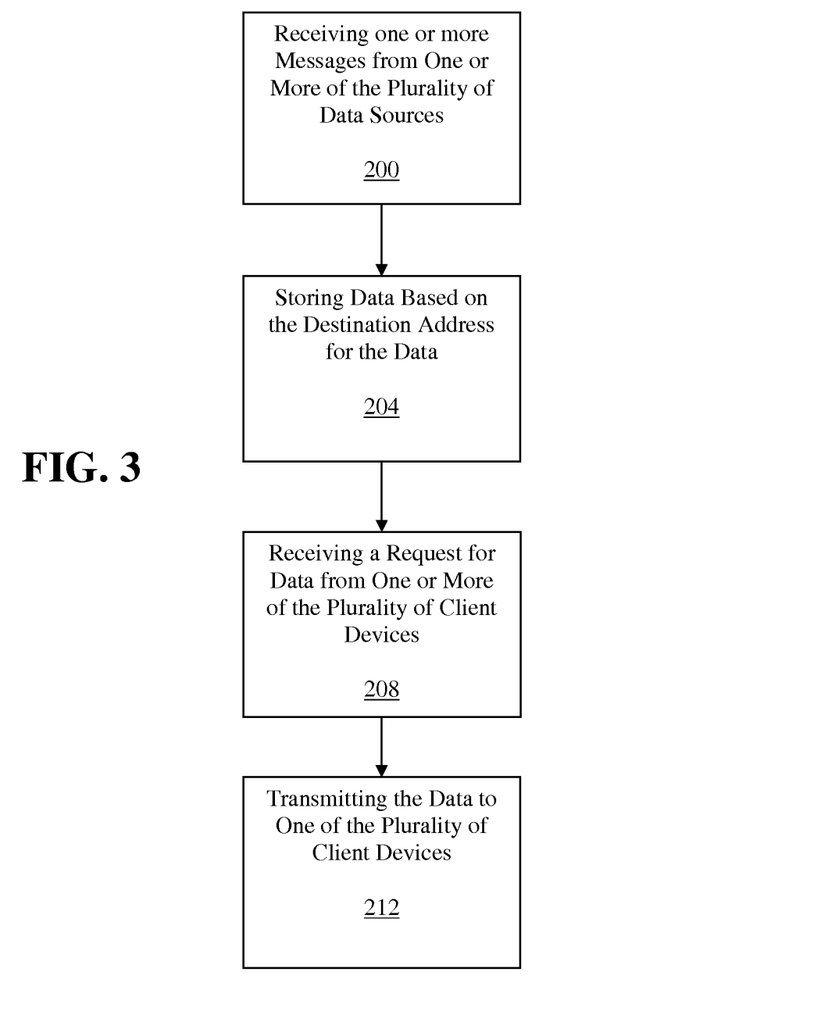
FIG. 3 depicts a flow chart showing one embodiment of a method for facilitating a stateless transmission of data.

FIG. 3 shows a flow chart depicting the operation of a system for facilitating a stateless transmission of data between a plurality of data sources and a plurality of client devices according to one embodiment. The operation is implemented by one or more IT servers, such as a centralized IT server. In one embodiment, the system 100, described above in connection with FIGS. 1 and 2, is used. In other embodiments, a different system may be used. The method is implemented in the order shown, but may be implemented in or according to any number of different orders. Additional, different, or fewer acts may be provided. For example, the acts of receiving a message from each of the plurality of data sources (act 200), receiving a request for data from one of the plurality of client devices (act 208), and transmitting data (act 212) may be repeated any number of different times. Messages and requests may be received from one, multiple, or all devices.

The operation or method includes receiving one or more messages from one or more of the plurality of data sources (act 200). The message includes data obtained by the respective data source and data indicative of a destination address for the data. The destination address is associated with a client device of the plurality of client devices. The message may be a hypertext transfer protocol (HTTP) GET request with a uniform resource locator (URL) that includes the data obtained by the respective data source and the data indicative of the destination address. The data obtained by the respective data source may be displayed as one or more of the parameters in the URL. The destination address may include a logical display name. The URL may, in some embodiments, include additional information or data, such as information or data that identifies the server and/or an input communications interface (e.g., a port) associated with the server, and/or a pre-determined random or non-predictable code or key associated with the destination address. In other embodiments, the message may be an IP or UDP datagram, a message corresponding to a different communications protocol, another request or message. The message may be posted, submitted, or transmitted to the server in response to a request for data from the server, by an operator or user of the respective data source, at pre-determined times, or in response to a trigger event at the data source.

The operation or method also includes storing, for each message, the data based on the destination address for the data (act 204). Storing may include generating a file or document that includes the data and storing the generated file based on the destination address for the data in the file. The generated file includes a webpage suitable for the World Wide Web. The file may be an HTML file, an XHTML file, or any other file. The generated file may be stored at or with a location or directory path and given or assigned a name related to or associated with the destination address. In one embodiment, the name of the file is the same as the destination address.

The operation or method further includes receiving a request for data from one or more of the plurality of client devices (act 208). The request includes data indicative of an address associated with the one of the plurality of client devices. The request may be an HTTP GET request with a URL that includes data indicative of an address associated with the client device from which the request is received. The address may be in the form of a logical display name. In other embodiments, the request for data may be an IP or UDP datagram, a request corresponding to a different communications protocol, or another request, and/or the URL may include additional or different information, such as, for example, information or data that identifies the server and/or an output communications interface (e.g., a port) associated with the server.

The operation or method further includes transmitting, when the address associated with the one of the plurality of client devices corresponds to the destination address for any of the stored data, the stored data with the corresponding destination address or addresses to the one or more of the plurality of client devices (act 212). The transmitting may be performed when the address associated with the one of the plurality of client devices corresponds to a name of one of the files. The transmitting may occur in direct response to receiving the request for data (i.e., immediately following the receipt of the request for data) or a short period of time following the receipt of the request for data.

Figure 4:
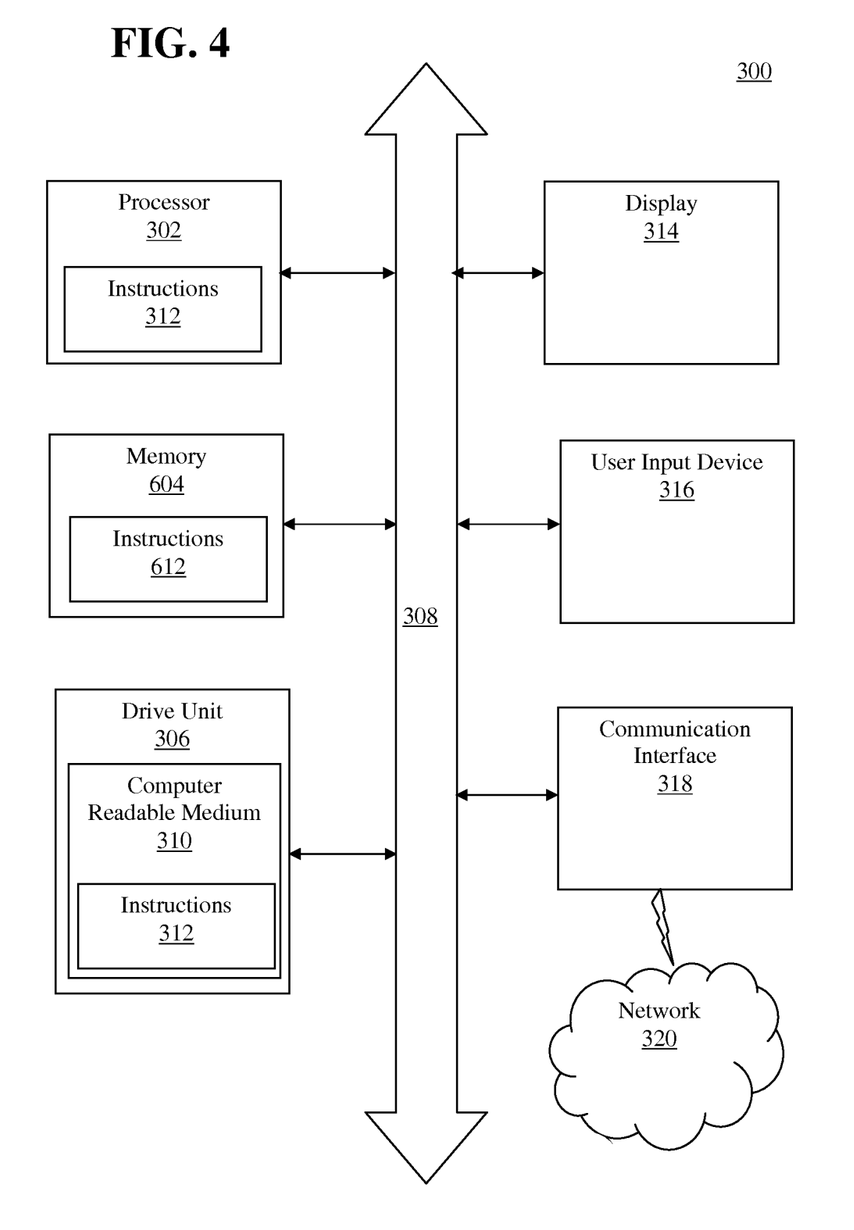
FIG. 4 depicts an exemplary computer system for use with the system of FIG. 2.

Referring to FIG. 4, an illustrative embodiment of a general computer system 300 is shown. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices. Any of the components discussed above may be a computer system 300 or a component in the computer system 300.

In a networked deployment, the computer system 300 may operate in the capacity of a server or as a client user computer in a client-server user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 4, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 304 includes a cache or random access memory for the processor 302. In alternative embodiments, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions stored in the memory 304. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multi-tasking, parallel processing and the like.

As shown, the computer system 300 may further include a display unit 314, such as a liquid crystal display (LCD), an organic light emitting diode (OLED), a flat panel display, a solid state display, a cathode ray tube (CRT), a projector, a printer or other now known or later developed display device for outputting determined information. The display 314 may act as an interface for the user to see the functioning of the processor 302, or specifically as an interface with the software stored in the memory 304 or in the drive unit 306.

Additionally, the computer system 300 may include an input device 316 configured to allow a user to interact with any of the components of system 300. The input device 316 may be a number pad, a keyboard, or a cursor control device, such as a mouse, or a joystick, touch screen display, remote control or any other device operative to interact with the system 300.

In a particular embodiment, as depicted in FIG. 4, the computer system 300 may also include a disk or optical drive unit 306. The disk drive unit 306 may include a computer-readable medium 310 in which one or more sets of instructions 312, e.g. software, can be embedded. Further, the instructions 312 may embody one or more of the methods or logic as described herein. In a particular embodiment, the instructions 312 may reside completely, or at least partially, within the memory 304 and/or within the processor 302 during execution by the computer system 300. The memory 304 and the processor 302 also may include computer-readable media as discussed above.

The present disclosure contemplates a computer-readable medium that includes instructions 312 or receives and executes instructions 312 responsive to a propagated signal, so that a device connected to a network 320 can communicate voice, video, audio, images or any other data over the network 320. Further, the instructions 312 may be transmitted or received over the network 320 via a communication port 318. The communication port 318 may be a part of the processor 302 or may be a separate component. The communication port 318 may be created in software or may be a physical connection in hardware. The communication port 318 is configured to connect with a network 320, external media, the display 314, or any other components in system 300, or combinations thereof. The connection with the network 320 may be a physical connection, such as a wired Ethernet connection or may be established wirelessly as discussed below. Likewise, the additional connections with other components of the system 300 may be physical connections or may be established wirelessly.

The network 320 may include wired networks, wireless networks, or combinations thereof, and may be representative of the networks 116 and/or 124. The wireless network may be a cellular telephone network, an 802.11, 802.16, 802.20, or WiMax network. Further, the network 320 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for facilitating a stateless transmission of data between a plurality of data sources and a plurality of client devices, the method comprising:
   receiving, by a processor, a message from at least one data source of the plurality of data sources, the message including data obtained by the respective data source and data indicative of a destination address for the data, the destination address associated with at least one client device of the plurality of client devices;
   storing, in a memory in communication with the processor, for the message, the data based on the destination address for the data;
   receiving, by the processor, a request for data from the at least one client device of the plurality of client devices, the request including data indicative of an address associated with the at least one client device of the plurality of client devices; and
   transmitting, by the processor, when the address associated with the at least one client device of the plurality of client devices corresponds to the destination address for any of the stored data, the stored data with the corresponding destination address to the at least one client device of the plurality of client devices.

2. The method of claim 1, wherein the message is a hypertext transfer protocol (HTTP) GET request.

3. The method of claim 2, wherein the HTTP GET request comprises a uniform resource locator (URL) that includes the data obtained by the data source and the data indicative of the destination address.

4. The method of claim 3, wherein the data obtained by the data source is displayed as one or more parameters in the URL.

5. The method of claim 1, wherein the destination address comprises a logical display name.

6. The method of claim 1, wherein the storing comprises creating a file for each destination address that includes the respective data, and storing each file based on the destination address for the respective data in the file.

7. The method of claim 6, wherein each file is an HTML file that includes plain text corresponding to the respective data.

8. The method of claim 6, further comprising: assigning a name to each file, the name for each file being a function of the destination address for the data in the respective file.

9. The method of claim 8, wherein the transmitting comprises transmitting when the address associated with the at least one client device of the plurality of client devices corresponds to the name of one of the files.

10. The method of claim 5, wherein the storing comprises creating a file for each logical display name that includes the respective data, and storing each file as a function of the logical display name for the respective data in the file.

11. The method of claim 1, further comprising: extracting, from each message, the data obtained by the data source and the data indicative of the destination address.

12. The method of claim 1, further comprising:
   receiving, before receiving the request for data from the at least one client device of the plurality of client devices, a start message from the at least one client device of the plurality of client devices;
   generating, in response to the start message, a file that includes one or more pre-configured requests for data; and
   transmitting the file to the at least one client device of the plurality of client devices;
   wherein the request for data received from the at least one client device of the plurality of client devices is a pre-configured request for data of the one or more pre-configured requests for data.

13. A system for facilitating a stateless transmission of data between a plurality of mobile data sources and a plurality of client devices, the system comprising:
   a server in communication with the plurality of mobile data sources and configured to receive requests from the plurality of mobile data sources, the requests including data obtained by the respective mobile data source and data indicative of a destination address for the data, the destination address associated with a client device of the plurality of client devices;

wherein the server is further configured to generate a file for each destination address that includes the respective data;

wherein the server is further configured to store the files based on the destination address for the data in the respective file;

wherein the server is in communication with the plurality of client devices and is further configured to receive a request for data from one client device of the plurality of client devices, the request including data indicative of an address associated with the one client device of the plurality of client devices; and wherein the server is further configured to transmit when the address associated with the one client device of the plurality of client devices corresponds to the destination address for any of the stored data, the stored data with the corresponding destination address to the one client device of the plurality of client devices.

14. The system of claim 13, wherein the respective data transmitted to the one client device of the plurality of client devices is configured to be displayed in a web browser installed on the one client device of the plurality of client devices.

15. The system of claim 13, wherein the request is a hypertext transfer protocol (HTTP) GET request that includes a uniform resource locator (URL), the URL including the data obtained by the mobile data source and the data indicative of the destination address.

16. The system of claim 13, wherein the destination address comprises a logical display name.

17. The system of claim 13, wherein each file is an HTML file that includes plain text corresponding to the respective data.

18. In a non-transitory computer-readable storage medium that stores instructions executable by one or more processors to facilitate a stateless transmission of data between a plurality of mobile data sources and a plurality of client devices, the instructions comprising:

receiving requests from the plurality of data sources, the requests being hypertext transfer protocol (HTTP) GET requests that include a uniform resource locator (URL), the URL including data obtained by the respective mobile data source and data indicative of a logical display name for the data, the logical display name associated with a client device of the plurality of client devices;

extracting, from each request, the data obtained by the data source and the data indicative of the logical display name;

creating, for each request, an HTML file that includes the extracted respective data;

storing the HTML files based on the logical display name for the data in the respective file;

receiving requests for data from the plurality of client devices, the requests including data indicative of a logical display name associated with the one client device of the plurality of client devices; and transmitting, when the logical display name associated with the one client device of the plurality of client devices corresponds to the logical display name for any of the stored data, the stored data with the corresponding logical display name to the one client device of the plurality of client devices.

19. The non-transitory computer-readable storage medium of claim 18, wherein the respective data transmitted to the one client device of the plurality of client devices is configured to be displayed in a web browser installed on the one client device of the plurality of client devices.

20. The non-transitory computer-readable storage medium of claim 18, wherein storing comprises assigning a name to each file, the name being equal to the destination address for the data in the respective file.

* * * * *